(12) United States Patent
Haack et al.

(10) Patent No.: US 11,643,181 B2
(45) Date of Patent: May 9, 2023

(54) CONNECTOR AND METHOD FOR CONNECTING A FRAME AND A STRINGER OF A FUSELAGE STRUCTURE OF AN AIRCRAFT, FUSELAGE STRUCTURE AND AIRCRAFT

(71) Applicant: Premium Aerotec GmbH, Augsburg (DE)

(72) Inventors: Cord Haack, Augsburg (DE); Carsten Paul, Augsburg (DE); Bernhard Hörger, Augsburg (DE)

(73) Assignee: Premium Aerotec GmbH

( * ) Notice: Subject to any disclaimer, the term of this patent is extended or adjusted under 35 U.S.C. 154(b) by 29 days.

(21) Appl. No.: 17/314,153

(22) Filed: May 7, 2021

(65) Prior Publication Data

US 2021/0347462 A1 Nov. 11, 2021

(30) Foreign Application Priority Data

May 8, 2020 (DE) .................... 10 2020 205 840.7

(51) Int. Cl.
  *B64C 1/00* (2006.01)
  *B64C 1/06* (2006.01)
  *B64F 5/10* (2017.01)

(52) U.S. Cl.
  CPC ............. *B64C 1/069* (2013.01); *B64C 1/061* (2013.01); *B64C 1/064* (2013.01); *B64F 5/10* (2017.01)

(58) Field of Classification Search
  None
  See application file for complete search history.

(56) References Cited

U.S. PATENT DOCUMENTS

| | | | |
|---|---|---|---|
| 2,389,767 A | 11/1945 | Dalton | |
| 3,600,016 A | 8/1971 | Dilley | |
| 5,924,650 A | 7/1999 | Richichi | |
| 7,635,106 B2 | 12/2009 | Pham et al. | |
| 8,087,621 B2 | 1/2012 | Sayilgan et al. | |
| 8,480,030 B2 | 7/2013 | Stephan | |
| 8,622,348 B2 | 1/2014 | Sabadie et al. | |
| 8,915,468 B2 | 12/2014 | Sabadie et al. | |
| 2010/0237195 A1 | 9/2010 | Stephan | |

(Continued)

FOREIGN PATENT DOCUMENTS

| | | |
|---|---|---|
| DE | 102007044386 A1 | 4/2009 |
| EP | 2212191 B1 | 11/2011 |

(Continued)

OTHER PUBLICATIONS

Search Report for European Application No. 21172756 dated Sep. 20, 2021. 2 pgs.

(Continued)

*Primary Examiner* — Alexander S Thomas
(74) *Attorney, Agent, or Firm* — Lerner David LLP

(57) ABSTRACT

A connector for connecting a frame to a transversely extending stringer of a fuselage structure of an aircraft includes a base carrier extending in a longitudinal connector direction, a first connecting portion connected to the base carrier and extending in a first transverse connector direction, the first connecting portion having a coupling structure in an end region remote from the base carrier for engaging around an end region of a cross-section of the stringer, and a second connecting portion connected to the base carrier and adapted to be connected to the frame.

10 Claims, 9 Drawing Sheets

(56) References Cited

U.S. PATENT DOCUMENTS

Figure 1:
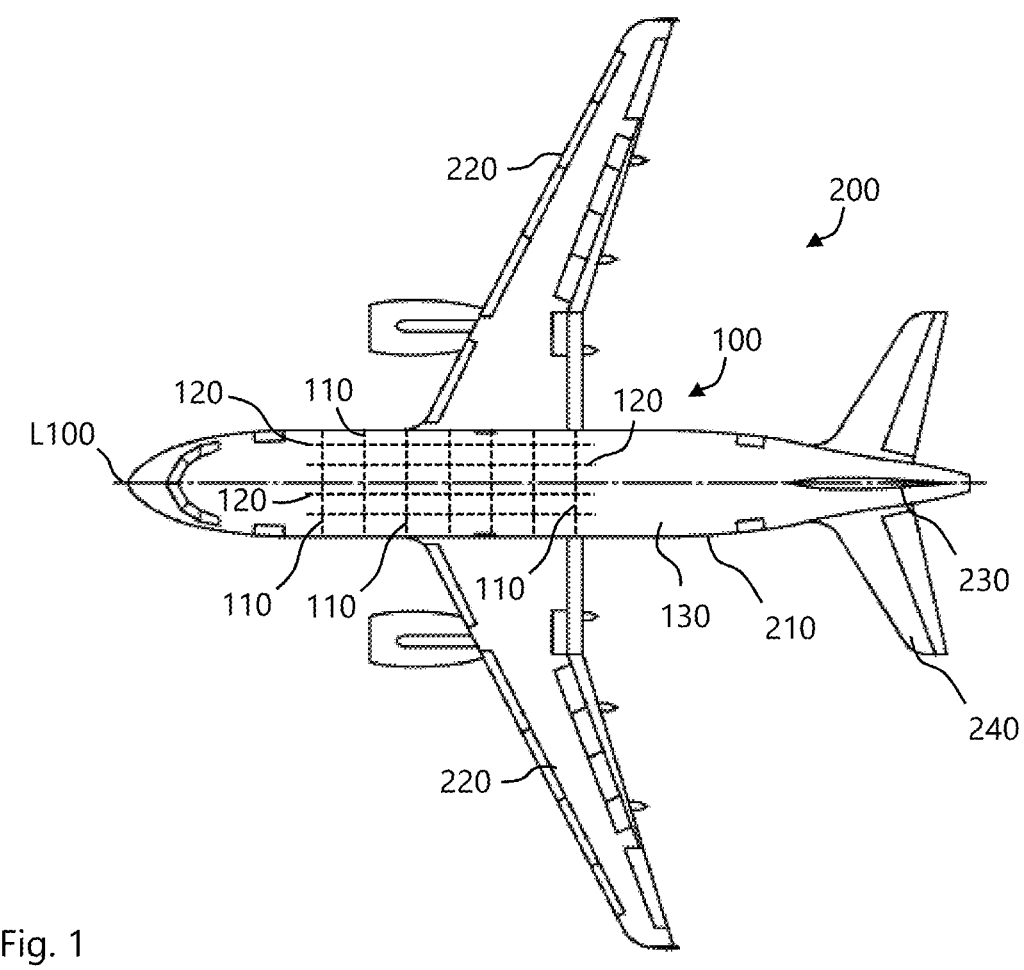

2011/0001010 A1  1/2011  Tacke et al.
2018/0162510 A1  6/2018  Dopker et al.

FOREIGN PATENT DOCUMENTS

EP    2301840 B1   8/2014
EP    2965983 A1   1/2016
EP    2965984 A1   1/2016

OTHER PUBLICATIONS

Search Report from German Office Action for Application No. 102020205840.7 dated Nov. 10, 2020; 1 page.

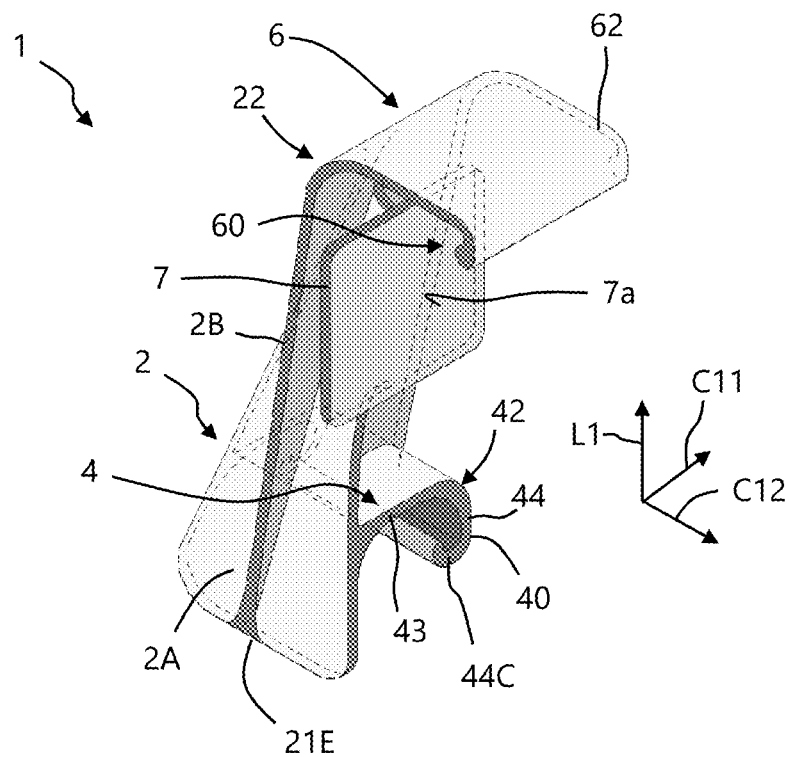
Fig. 3
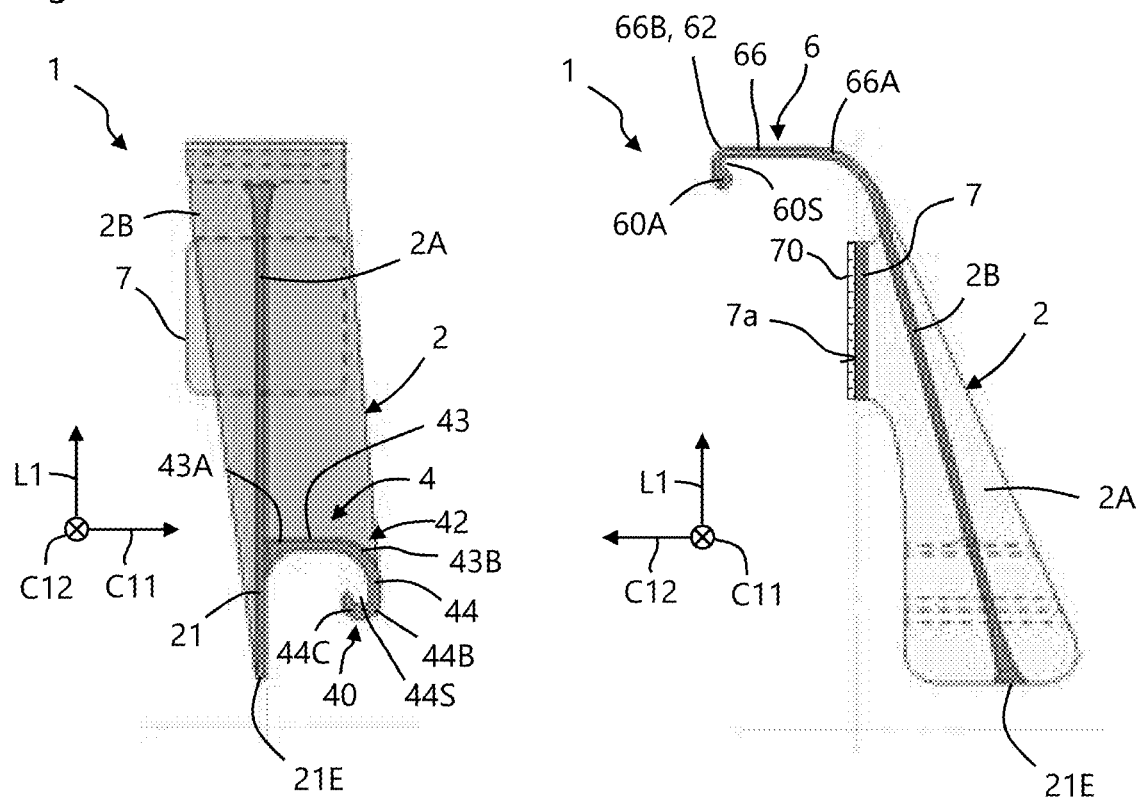
Fig. 4
Fig. 5

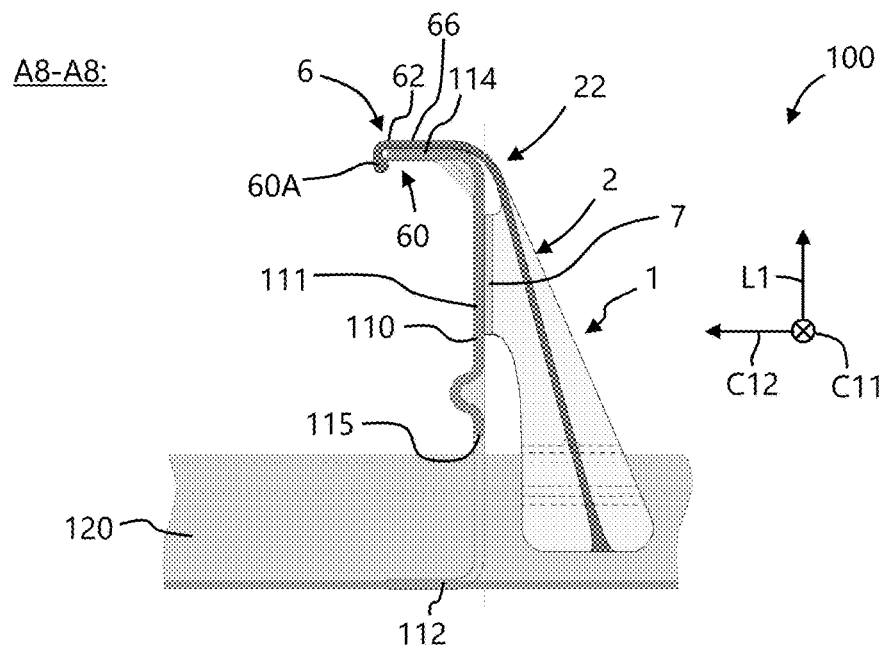
Fig. 8
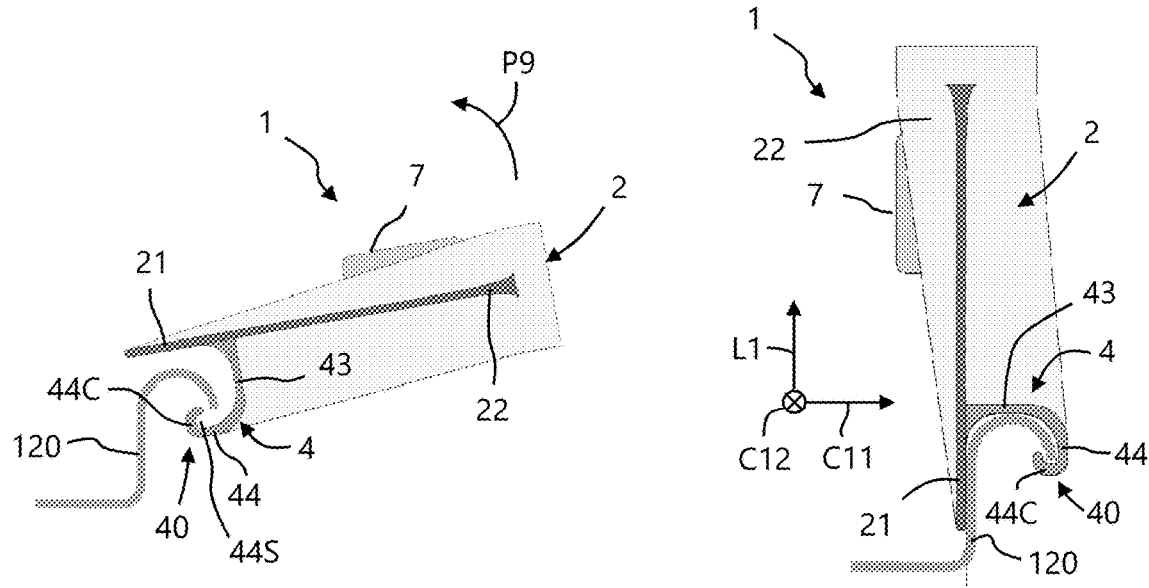
Fig. 9
Fig. 10

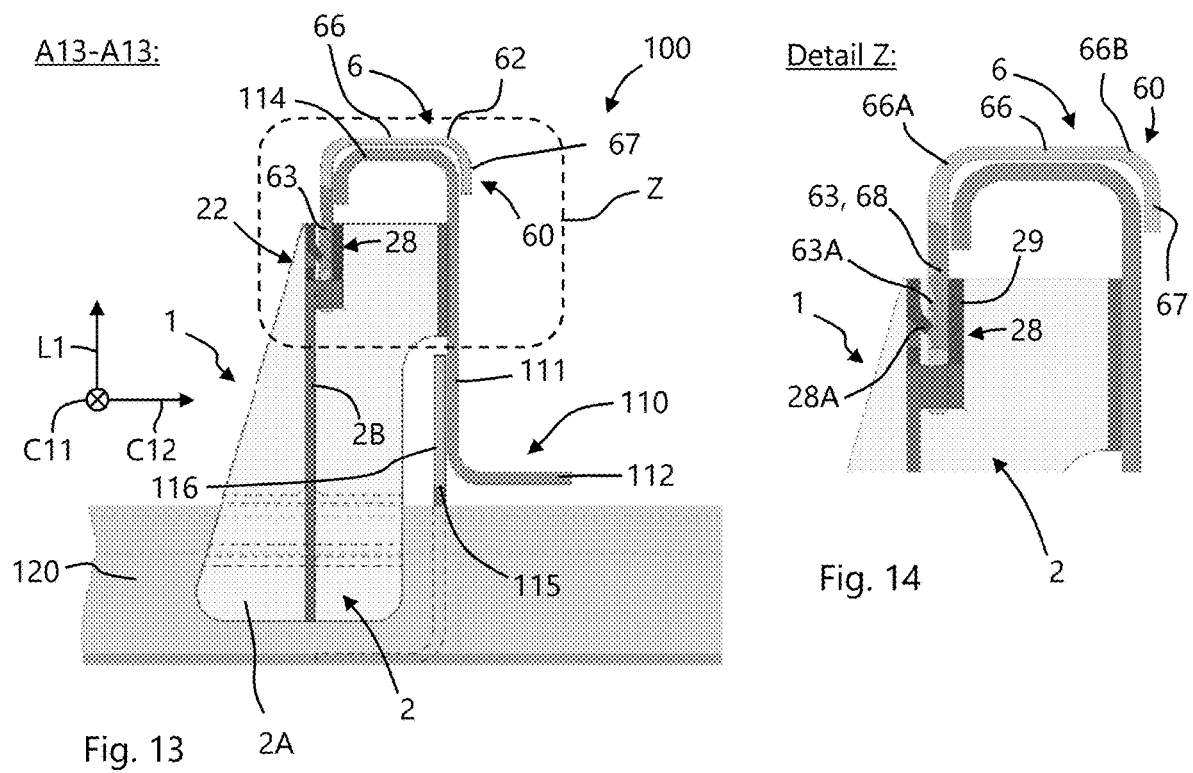
Fig. 13
Fig. 14
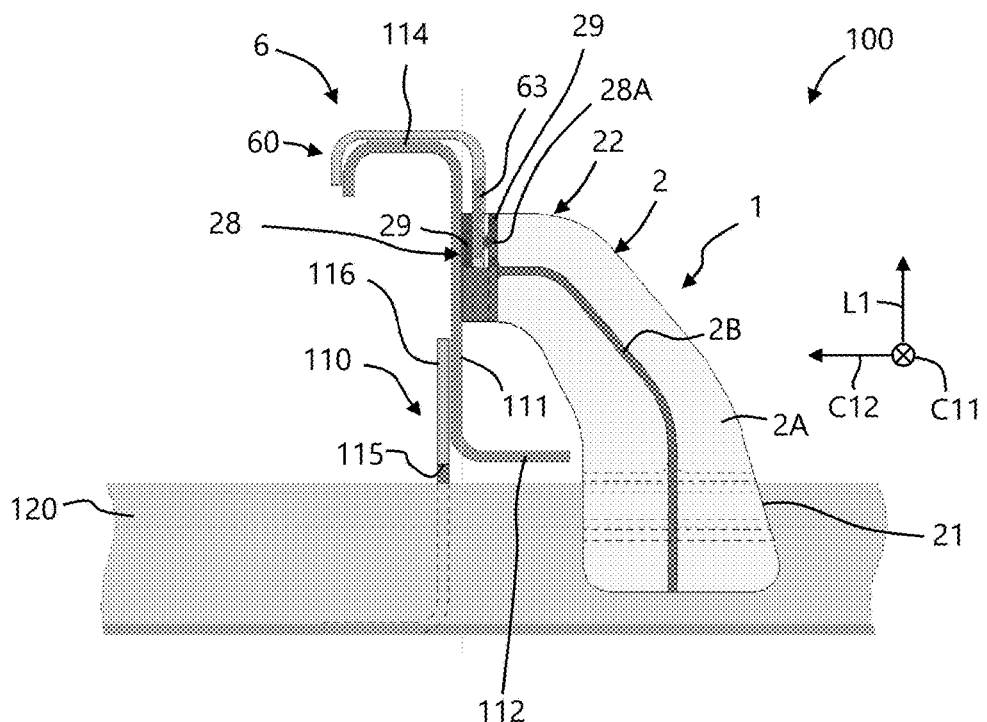
Fig. 15

A19-A19:

CONNECTOR AND METHOD FOR CONNECTING A FRAME AND A STRINGER OF A FUSELAGE STRUCTURE OF AN AIRCRAFT, FUSELAGE STRUCTURE AND AIRCRAFT

The present invention relates to a connector and a method for connecting a frame and a stringer of an aircraft fuselage structure, to an aircraft fuselage structure, and to an aircraft.

A fuselage of an aircraft typically has a fuselage structure comprising a plurality of frames arranged parallel to each other and enclosing a longitudinal fuselage axis, and stringers extending along the longitudinal fuselage axis. An outer skin is generally attached to the stringers and the frames. Frames exist in various cross-sectional shapes, such as Z-sections or T-sections. Frames also typically have stringer recesses through which the stringers extend.

The frames and the stringers are typically fixed to each other by means of connectors. For example, U.S. Pat. No. 3,600,016 A describes an angled connector attached to the frame and the stringer, which is S-shaped, respectively by means of rivets. Another connector is described in EP 2 212 191 B1, the connector having a foot flange connected to a stringer and a frame flange extending transversely thereto and connected to a frame, the foot and bulkhead flanges each having holes for the passage of rivets or other connecting elements.

Another fuselage structure is described in EP 2 301 840 B1, wherein the fuselage structure comprises Ω-shaped stringers and annular frames of C-shaped cross-section extending across the stringers, and wherein L-shaped support elements are provided which are connected by rivets to a foot of the stringer and to the frame.

It is the objective of the present invention to find improved solutions for fuselage structures with stringers and frames, in particular solutions which simplify assembly of the fuselage structure.

This objective is solved in each case by the objects of the independent claims.

Advantageous embodiments and further developments result from the subclaims depending on the independent claims in connection with the description.

According to a first aspect of the invention, a connector is provided for connecting a frame to a stringer extending transversely thereof of a fuselage structure of an aircraft. The connector comprises a base carrier extending in a longitudinal connector direction, a first connecting portion connected to the base carrier and extending in a first transverse connector direction, the first connecting portion having a coupling structure in an end region remote from the base carrier for engaging around an end region of a cross-section of the stringer, and a second connecting portion connected to the base carrier and adapted to be connected to the frame. The first transverse connector direction is transverse to the longitudinal connector direction.

According to a second aspect of the invention, a fuselage structure for an aircraft is provided. The fuselage structure comprises a frame enclosing a longitudinal fuselage axis, in particular an annular frame, having a stringer recess, a stringer extending along the longitudinal fuselage axis through the stringer recess of the frame, and a connector according to the first aspect of the invention. The first connecting portion of the connector engages the coupling structure around an end region of a cross-section of the stringer. The second connecting portion of the connector is connected to the frame.

According to a third aspect of the invention, a method of connecting a frame and a stringer of a fuselage structure according to the second aspect of the invention is provided. The method comprises inserting the end region of the cross-section of the stringer into the coupling structure of the first connecting portion of the connector, positioning the second connecting portion of the connector on the frame, and connecting the second connecting portion of the connector to the frame.

An idea underlying the invention is to attach a frame and a stringer of a fuselage structure to each other at their intersection by means of a connector which can be connected form-fitting to at least the stringer. For this purpose, the connector has a first connecting portion with a coupling structure which is designed to engage around one end of the cross-section of the stringer. The coupling structure can be hook-shaped, for example, and defines by its hook shape a slot which is open on one side, for example U-shaped, into which one end of a web of the stringer can be inserted. The coupling structure thus embraces an end region of the cross section of the stringer. The first connecting portion extends transversely to a base carrier of the connector, which may have, for example, an X-shaped, an H-shaped, or other cross-sectional profile. The coupling structure is provided at an end region of the connecting portion remote from the base carrier. Further, the coupling structure may also be L-shaped with a first portion and a second portion extending transversely thereto and extending along the longitudinal connector direction and along the base carrier, respectively. Thus, in both the L-shaped and hook-shaped configurations of the coupling structure, a receiving region for receiving the cross-section of the stringer may be formed between the coupling structure and the base carrier. Thus, the end region of the cross section of the stringer may be received in the slot defined by the hook shape of the coupling structure and/or the stringer may be clamped between the coupling structure and the base carrier.

An advantage of the connector is that a form-fitting connection between the stringer and the connector is achieved by the coupling structure encompassing the end region of the cross-section of the stringer, which can be assembled in a simple manner by inserting the end region of the cross-section of the stringer into the hook-shaped coupling structure. In a sense, the cross-sectional profile of the stringer can be hooked or clamped into the coupling structure of the connector. This facilitates assembly in particular in the intersection region of frame and stringer, which may be difficult to access. In particular, riveting of the connector and stringer is no longer necessarily required.

According to some embodiments of the connector, it may be provided that the second connecting portion is oriented in a second transverse connector direction. The second transverse connector direction is transverse to the first transverse connector direction and transverse to the longitudinal connector direction. In an assembled condition, the first transverse connector direction is thus oriented along the frame and the second transverse connector direction is oriented along the stringer or transverse to the frame. Consequently, the second connecting portion can be coupled to the frame in a direction transverse to the frame. This improves support of the frame by the second connecting portion and load transfer between the frame and the stringer by the connector.

According to some embodiments of the connector, it may be provided that the second connecting portion is arranged in a second end region of the base carrier with respect to the longitudinal connector direction and extends in the second transverse connector direction, and wherein the second connecting portion comprises, in an end region facing away from the base carrier, a coupling structure, for example L-shaped or hook-shaped, for engaging around an end region of a cross-section of the frame. For example, the second connecting portion may comprise a transverse web at the end of which a hook-shaped bend or projection is provided. The hook shape of the coupling structure of the second connecting portion defines a slot into which an end of a web of the frame may be inserted. In the L-shaped structure, the end region of the cross-section frame can be sandwiched between the coupling structure and the second end region of the base carrier. Thus, the frame can also be connected to the connector in a form-fit manner, further facilitating assembly.

According to some embodiments of the connector, it may be provided that the second connecting portion is integrally formed with the base carrier. In this case, if the second connecting portion is implemented with an L-shaped or hook-shaped coupling structure, it can in particular be designed to be elastically deformable so that the coupling structure can be latched to the frame.

According to some embodiments of the connector, it may be provided that the second connecting portion has a guiding region which is guided in a guide of the base carrier so as to be displaceable in the longitudinal connector direction and wherein the guide has a first locking structure, in particular an elastic web, which engages in a locking structure formed in the guiding region, in particular in the form of teeth. For example, the second connecting portion can have a web as a guiding region, which is guided in a linearly displaceable manner between two webs of the base carrier. A toothed structure can be provided on the web of the second connecting portion, which can be latched to an elastic pawl of the base carrier. This allows the coupling structure to be displaced in the longitudinal direction of the connector and thereby brought into engagement with the frame. The locking structure can be used to fix the position of the second connecting portion.

According to some embodiments, the connector may comprise a plate-shaped adhesive carrier having a surface oriented in the second transverse connector direction and coated with an adhesive, the adhesive carrier being disposed between the first and second connecting portions with respect to the longitudinal connector direction and connected to the base carrier. For example, the adhesive carrier may be plate-shaped. The adhesive carrier creates an additional rivet-free connection between the connector and the frame. Further, additional support of the frame is achieved by the adhesive carrier, which further improves the stiffness of the fuselage structure.

According to some embodiments of the connector, it may be provided that the second connecting portion is plate-shaped for abutment against a plate-shaped portion of the frame. Accordingly, the second connecting portion may be formed as a flange which may be, for example, glued to the frame or connected by connecting elements such as rivets, bolts, screws or the like. Thus, a simple structure of the connector is realized, which can be flexibly combined with a variety of frame cross sections. The second connecting portion can in particular have a flat contact surface which is designed to bear against a plate-shaped region of the frame. The contact surface can be oriented in particular in the second transverse connector direction or in the first transverse connector direction.

According to some embodiments of the connector, it may be provided that the plate-shaped second connecting portion is arranged in a second end region of the base carrier with respect to the longitudinal connector direction. This further improves the support of the frame against tilting.

According to some embodiments of the connector, it may be provided that the first connecting portion comprises a transverse web extending in the first transverse connector direction and having a first end connected to the base carrier, the coupling structure comprising a longitudinal web extending from a second end of the transverse web along a first end region of the base carrier, i.e. along the longitudinal connector direction, the longitudinal web having a U-shaped bend at an end facing away from the transverse web on a side facing the base carrier. The U-shaped bend thus forms a slot which has an opening facing the transverse web. The transverse web, the longitudinal web and the first end region of the base carrier define a clamping space. Thus, a particularly reliable retention and clamping of the stringer in the first connecting portion can be achieved.

According to one embodiment of the fuselage structure, the stringer may have an S-shaped cross-section with the coupling structure engaging behind the end region of the S-shaped cross-section of the stringer with respect to a radial fuselage direction perpendicular to the longitudinal fuselage axis. For example, the coupling structure of the first connecting portion may be formed, as described, with the transverse web, the longitudinal web, and the U-shaped bend at the end of the longitudinal web.

According to a fourth aspect of the invention, a fuselage structure for an aircraft is provided. The fuselage structure according to this aspect of the invention comprises a frame, in particular an annular frame, enclosing a longitudinal fuselage axis and having a frame foot, a frame head which is located opposite the frame foot with respect to a radial fuselage direction perpendicular to the longitudinal fuselage axis, and a stringer recess formed in the region of the frame foot, a stringer extending along the longitudinal fuselage axis through the stringer recess of the frame, which stringer may have, for example, an Ω-shaped cross-section, a flatly extending outer skin, which is attached to the frame foot of the frame and the stringer, and a frame support. The frame support includes a support foot partially disposed between the outer skin and the frame foot, a support beam extending from the support foot in the radial fuselage direction, and a connecting portion connected to the support beam and having a coupling structure in an end region remote from the support beam, the coupling structure embracing an end region of a cross section of the frame head.

The connecting structure of the frame support is thus designed for form-fitting connection to the frame, which facilitates assembly of the frame support. For example, the connecting portion may have a transverse web at the end of which a hook-shaped bend or extension is provided. The hook shape of the coupling structure of the connecting portion defines a slot into which one end of a web of the frame can be inserted. In the L-shaped structure, the end region of the cross-section frame can be sandwiched between the coupling structure and the second end region of the base carrier. Thus, the frame can also be connected to the connector in a form-fitting manner, further facilitating assembly.

Optionally, the frame support can have at least one abutment plate arranged between the support foot and the connecting portion with respect to the radial fuselage direction and connected to the support beam, which abutment plate rests against the frame. The abutment plate thus has a surface facing the frame, in particular facing a main web of the frame extending in the radial fuselage direction. This may optionally be coated with an adhesive layer which bonds the abutment plate and the frame together.

According to a fifth aspect of the invention, there is provided an aircraft having a fuselage structure according to the second or fourth aspect of the invention.

With respect to directional indications and axes, in particular directional indications and axes relating to the course of physical structures, it is understood herein by a course of an axis, of a direction or of a structure "along" another axis, direction or structure that these, in particular the tangents resulting in a respective location of the structures, each run at an angle of less than 45 degrees, preferably less than 30 degrees, and in particular preferably parallel to one another.

With respect to directional indications and axes, in particular directional indications and axes relating to the course of physical structures, it is understood herein that a course of an axis, of a direction or of a structure "transversely" to another axis, direction or structure means that these, in particular the tangents resulting in a respective location of the structures, each extend at an angle of greater than or equal to 45 degrees, preferably greater than or equal to 60 degrees, and in particular preferably perpendicular to one another.

As used herein, "integral", "one-piece", "integrated" or "in one piece" components are generally understood to mean that these components are present as a single part forming a material unit and, in particular, are manufactured as such, with one component not being detachable from the other without breaking the material cohesion of the other.

Figure 2:
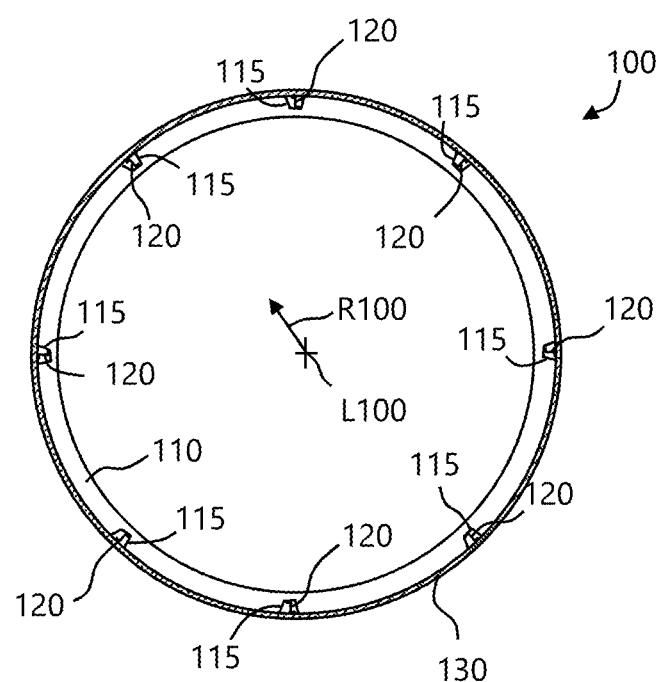
Figure 6:
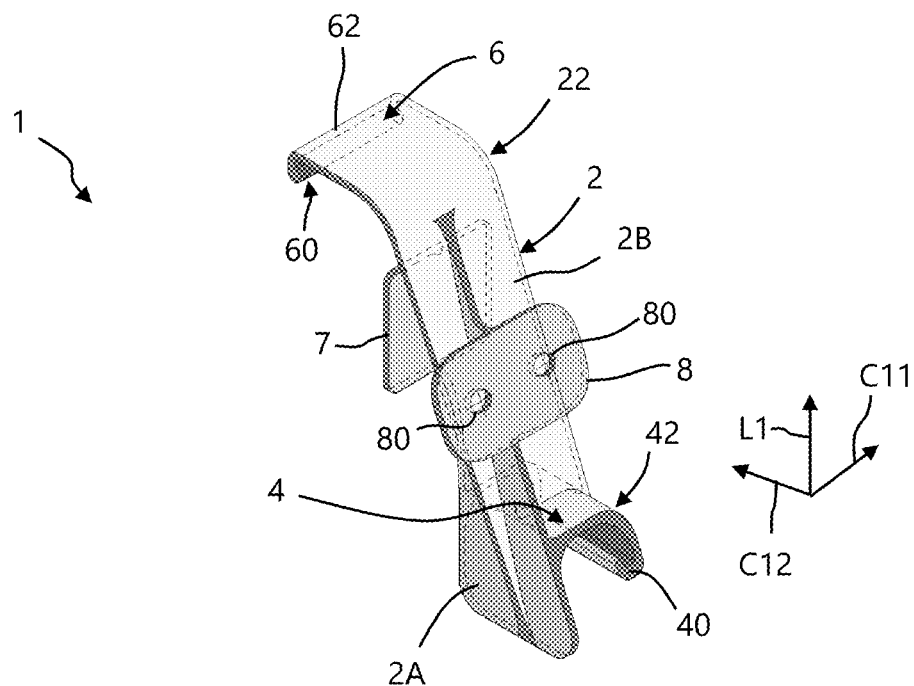
Figure 7:
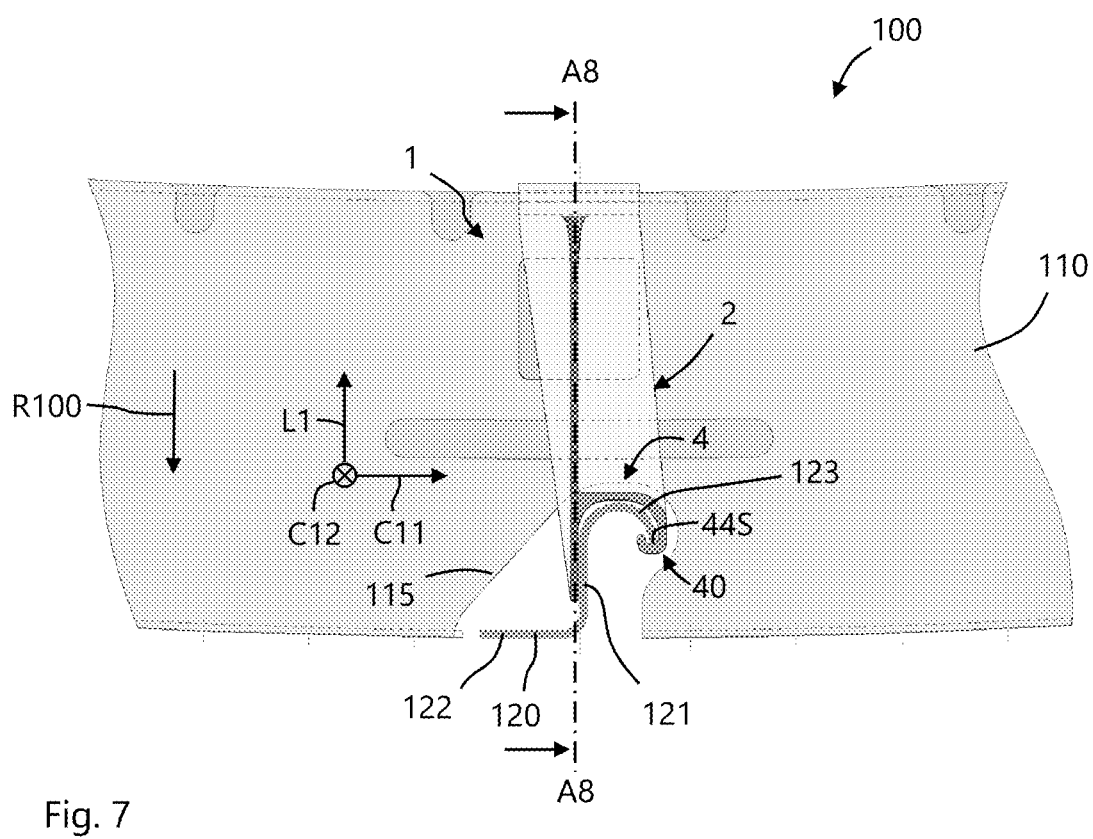
Figure 11:
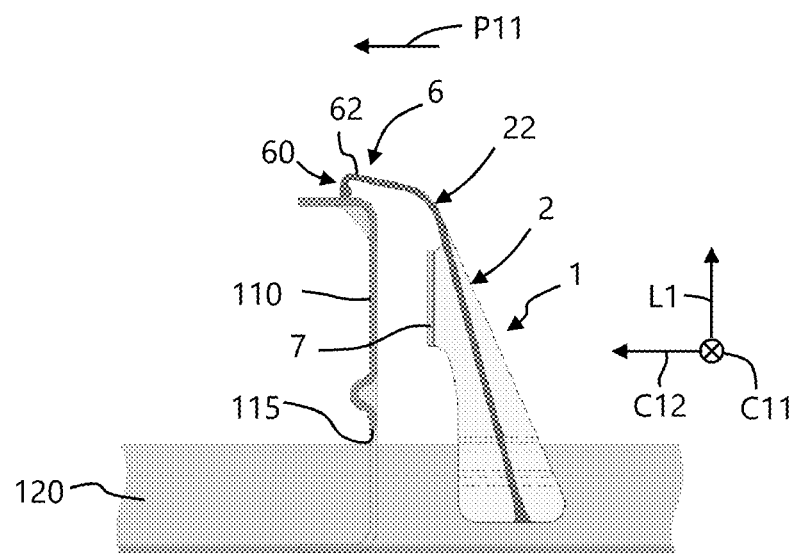
Figure 12:
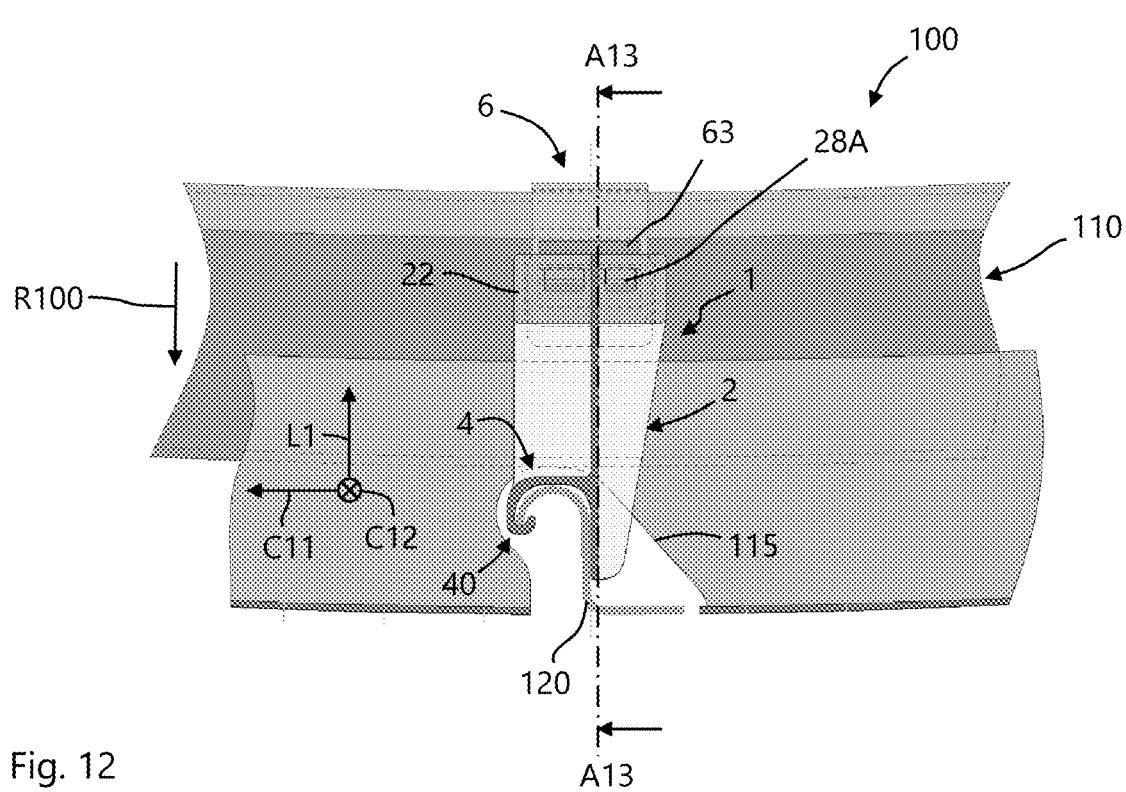
Figure 16:
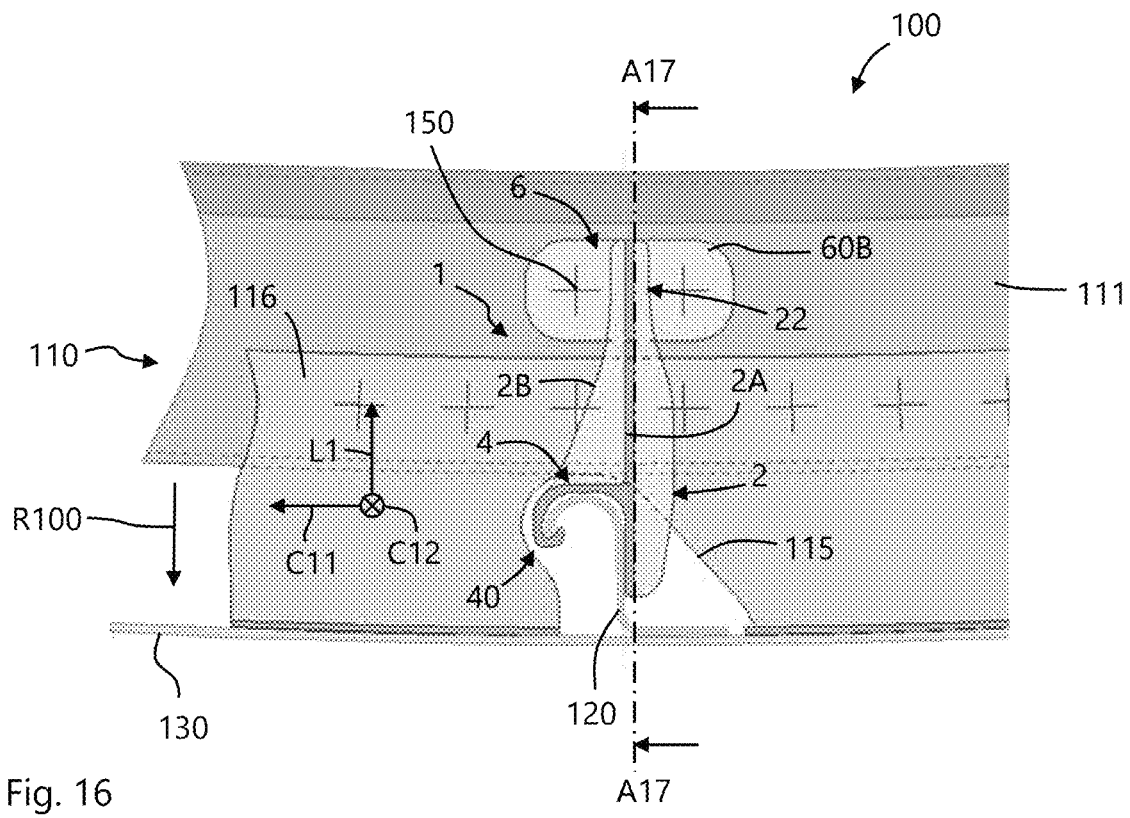
Figure 17:
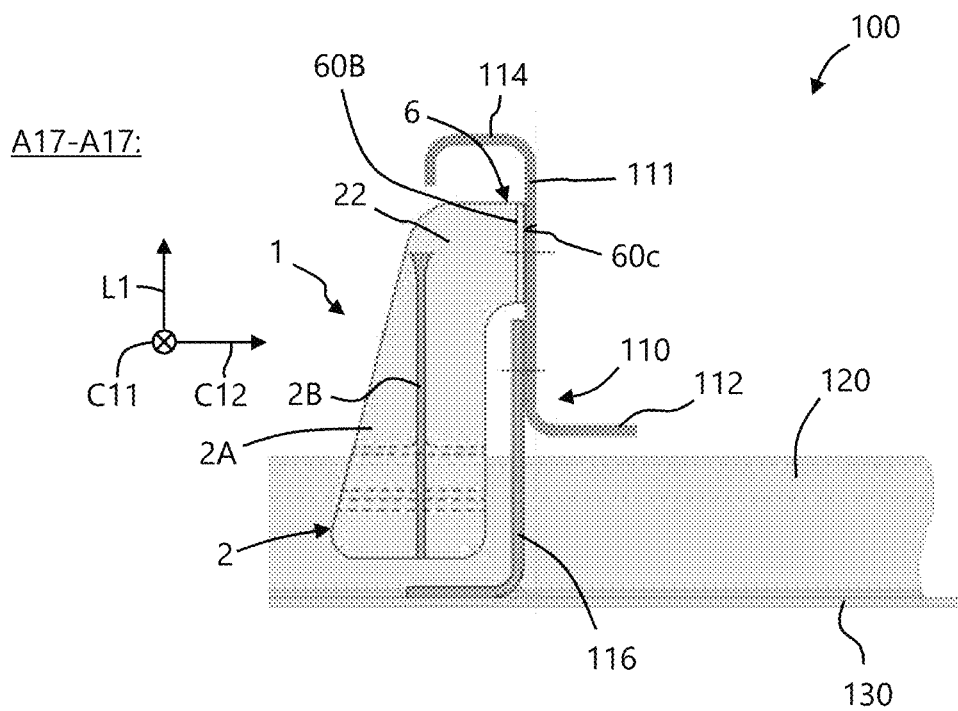
Figure 18:
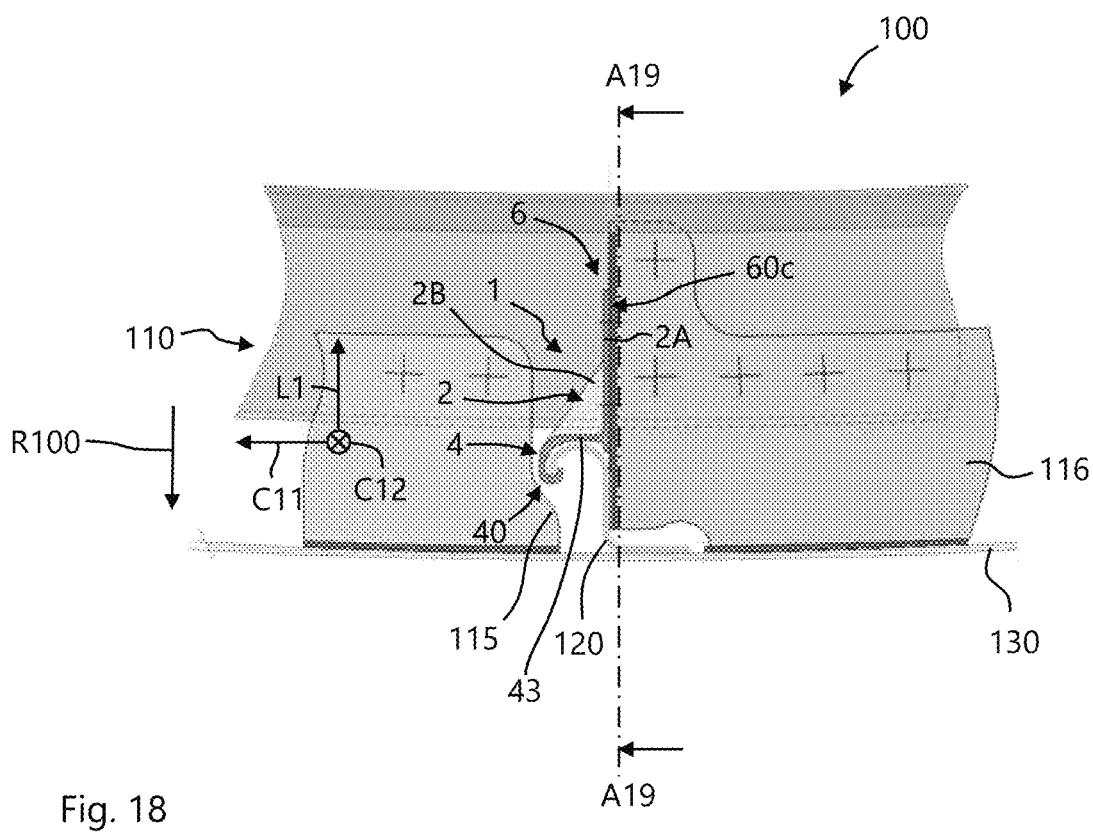
Figure 19:
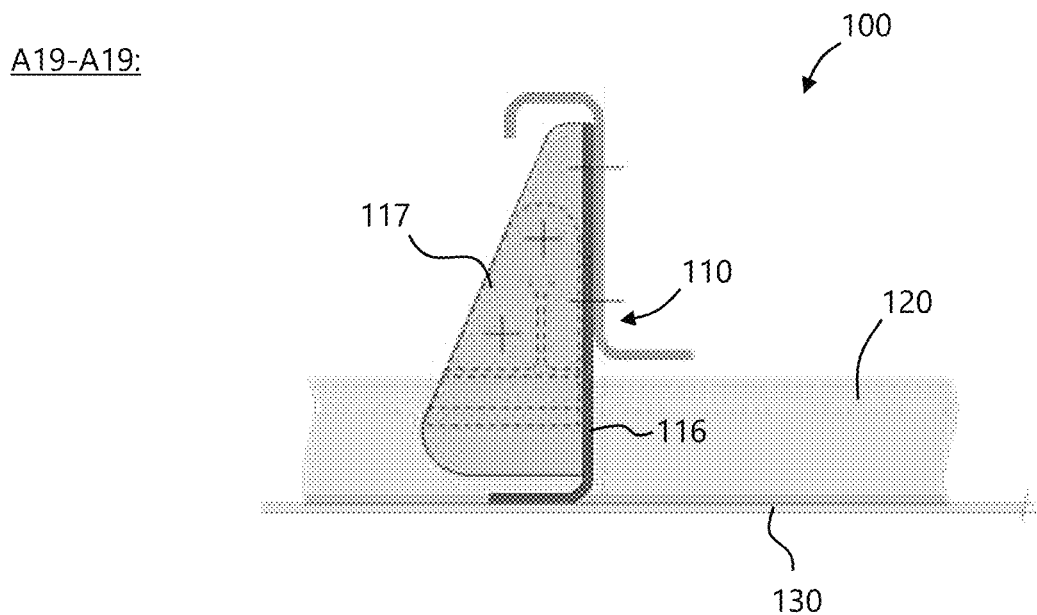
Figure 20:
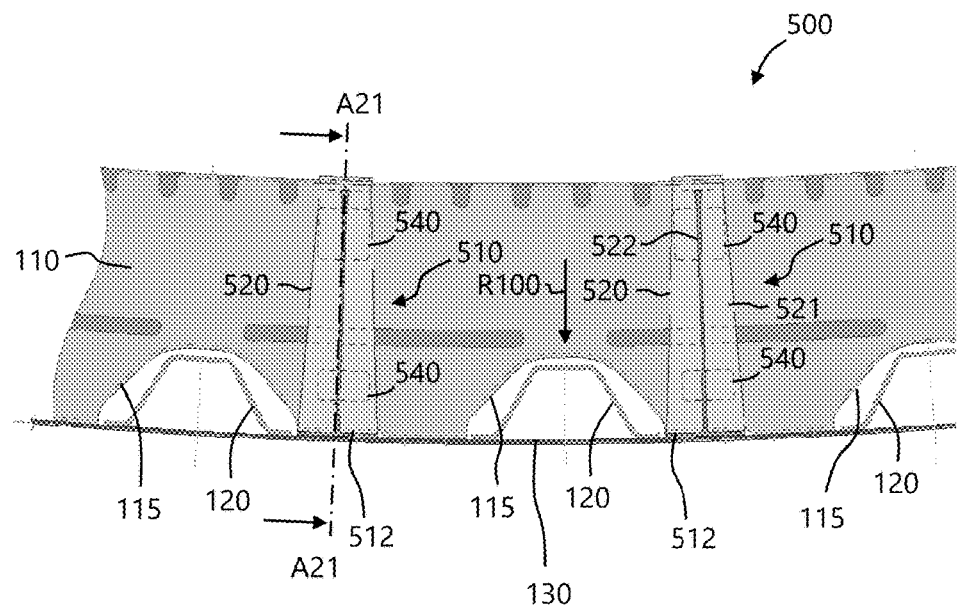
Figure 21:
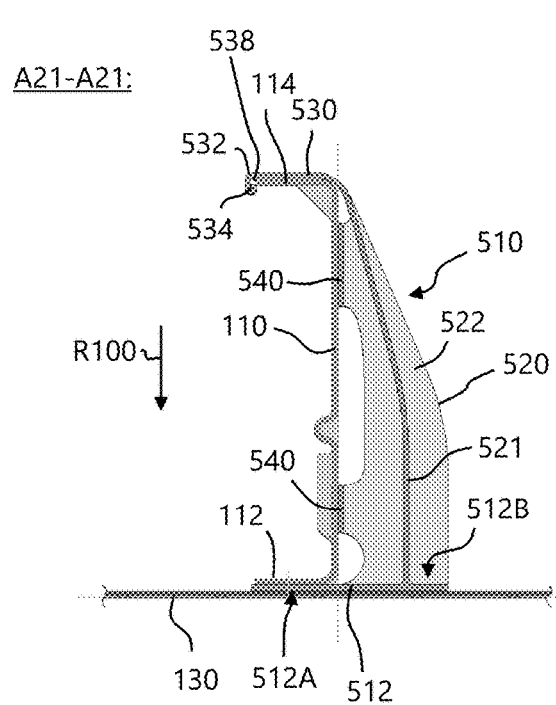
Figure 22:
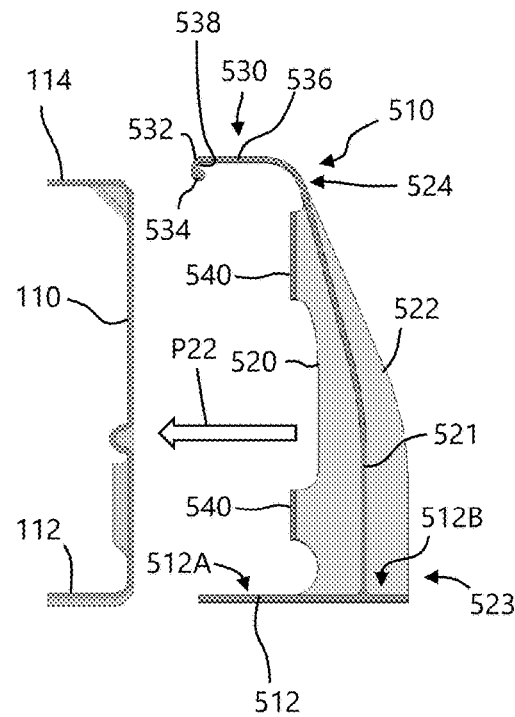

The invention is explained below with reference to the figures in the drawings. From the figures show:

FIG. 1 a schematic view of an aircraft according to an embodiment of the present invention;

FIG. 2 a schematic sectional view of a fuselage structure according to an embodiment of the present invention;

FIG. 3 a perspective view of a connector according to an embodiment of the invention;

FIG. 4 a side view of the connector from FIG. 3, which results when viewed in a first transverse connector direction;

FIG. 5 a side view of the connector from FIG. 3, which results when viewed in a second transverse connector direction;

FIG. 6 a perspective view of a connector according to a further embodiment of the invention;

FIG. 7 a detailed view of an intersection region of a frame and a stringer of a fuselage structure according to an embodiment of the invention;

FIG. 8 a sectional view of the fuselage structure shown in FIG. 7, resulting from a section along line A8-A8 drawn in FIG. 7;

FIG. 9 a step of a method according to the invention for connecting a frame and a stringer of the fuselage structure shown in FIGS. 7 and 8;

FIG. 10 a further step of the method for connecting a frame and a stringer of the fuselage structure shown in FIGS. 7 and 8;

FIG. 11 a step of a method according to the invention for connecting a frame and a stringer of the fuselage structure shown in FIGS. 7 and 8;

FIG. 12 A detailed view of an intersection region of a frame and a stringer of a fuselage structure according to another embodiment of the invention;

FIG. 13 a sectional view of the fuselage structure shown in FIG. 12, resulting from a section along line A13-A13 drawn in FIG. 12;

FIG. 14 a detailed view of the region indicated by the letter Z in FIG. 13;

FIG. 15 a detailed view of an intersection region of a frame and a stringer of a fuselage structure according to another embodiment of the invention;

FIG. 16 a detailed view of an intersection region of a frame and a stringer of a fuselage structure according to another embodiment of the invention;

FIG. 17 a sectional view of the fuselage structure shown in FIG. 16, resulting from a section along line A17-A17 drawn in FIG. 16;

FIG. 18 a detailed view of an intersection region of a frame and a stringer of a fuselage structure according to another embodiment of the invention;

FIG. 19 a sectional view of the fuselage structure shown in FIG. 18, resulting from a section along line A19-A19 drawn in FIG. 18;

FIG. 20 a detailed view of a plurality of intersecting regions of a frame and with stringers of a fuselage structure according to another embodiment of the invention;

FIG. 21 a sectional view of the fuselage structure shown in FIG. 20, resulting from a section along line A21-A21 drawn in FIG. 20; and FIG. 22 a step of mounting a frame support to the frame of the fuselage structure shown in FIGS. 20 and 21.

In the figures, the same reference signs denote identical or functionally identical components, unless otherwise indicated.

FIG. 1 shows a schematic top view of an aircraft 200. The aircraft 200 has a fuselage 210 extending along a longitudinal fuselage axis L100, at least portions of which are substantially cylindrical in shape, and from which wings 220, a vertical stabilizer 230, and an elevator 240 extend. The fuselage 210 includes a fuselage structure 100 having a plurality of frames 110, stringers 220, and an outer skin 130. The frames 110 and stringers 120 are shown only symbolically by dashed lines in FIG. 1. As can be seen in FIG. 1, a plurality of frames 110 may be provided and may be spaced along the longitudinal fuselage axis L200 and parallel to each other. The stringers 120 extend transversely to the frames 110 along the longitudinal fuselage axis L100.

FIG. 2 schematically shows a sectional view of the fuselage structure 100. As schematically shown in FIG. 2, the frames 110 each form a closed frame which defines the fuselage cross-section or defines and encloses the longitudinal fuselage axis L100. As can also be seen in FIG. 2, the frame 110 has at least one stringer recess 115 through each of which a stringer 120 extends. A stringer 120 thus crosses or penetrates a frame 110 in a respective intersecting region or at a crossing point. The outer skin 130 may be attached to the frames 110 and/or the stringers 120, for example riveted and/or glued thereto.

FIGS. 7 to 19 each show aborted views of the intersection of stringer 120 and frame 110 of fuselage structures 100, in which frame 110 and stringer 120 are connected by means of a connector 1. In FIGS. 3 to 6 as well as in FIGS. 7 to 19, various connectors 1 are shown. FIGS. 20 to 22 show a fuselage structure 500 in which frame 110 and stringer 120 are not connected by a connector 1, and the frame 110 is reinforced or supported by a frame support 510. Further, the fuselage structure shown in FIGS. 20 to 22 may be constructed as explained with reference to FIGS. 1 and 2.

In FIGS. 3 to 5, a connector 1 for connecting the frame 110 to the stringer 120 in the intersecting area is shown as an example. As shown in FIGS. 3 to 5, the connector may include a base carrier 2, a first connecting portion 4, and a second connecting portion 6. Optionally, an adhesive carrier 7 may also exist.

The base carrier 2 may be generally realized as a profile beam extending in a longitudinal connector direction L1. As exemplified in FIGS. 3 to 5 by way of example, the base carrier 2 may have, for example, a cruciform cross-section. In particular, the base carrier 2 may have a plate-shaped first web 2A and a plate-shaped second web 2B intersecting the first web 2A and extending transversely thereto, as exemplified in FIGS. 3 to 5 by way of example. As further shown in FIGS. 3 to 5, the first web 2A may optionally have an approximately triangular circumference. However, the second web 2B may also extend from the first web 2A transversely thereto so as to define a T-shaped cross-section, as shown purely by way of example in FIG. 18. Generally, the base carrier 2 extends in the longitudinal connector direction L1 and has a first end region 21 and a second end region 22 located opposite thereto with respect to the longitudinal connector direction L1.

As shown in FIGS. 3 to 5 purely by way of example, the first connecting portion 4 may comprise, for example, a transverse web 43 and a coupling structure 40. As can be seen in particular in FIG. 4, the transverse web 43 may extend in a first transverse connector direction C11 extending transversely to the longitudinal connector direction L1. A first end 43A of the transverse web 43 is connected to the base carrier 2, for example to the first web 2A of the base carrier 2. A second end 43B of the transverse web 43 is located facing away from the base carrier 2 with respect to the first transverse connector direction C11, in particular facing away from the first web 2A of the base carrier 2. The second web 2B of the base carrier 2 may, for example, also extend in the first transverse connector direction C11 and optionally be connected to the transverse web 43, as shown by way of example in FIG. 4. The transverse web 43 may be arranged in the region of the first end region 21 of the base carrier 2, as exemplarily shown in FIGS. 3 to 5 by way of example. The first end region 21 of the base carrier 2 may thus extend between the first end 21 E of the base carrier 2 and the transverse web 43. In particular, the transverse web 43 may be integrally formed with the base carrier 2, for example, the base carrier 2 and the transverse web 43 may be manufactured by an additive manufacturing process, such as a 3-D printing process, or a casting process.

As shown in FIGS. 3 to 5 purely by way of example, the coupling structure 40 may include a longitudinal web 44 and, alternatively or in addition to the longitudinal web 44, a hook-shaped or U-shaped bend 44C. The coupling structure 40 is generally configured to engage an end region of a cross-section of the stringer 120, such that the stringer 120 can be form-fittingly retained to the first connecting portion 4.

As can be seen in particular in FIG. 4, the longitudinal web 44 may extend from the second end 43B of the transverse web 43 along the first end region 21 of the base carrier 2, in particular towards the first end 21 E of the base carrier 2. Thus, the longitudinal web 44 extends along the longitudinal connector direction L1. In particular, the transverse web 43 may extend along the first web 2A of the base carrier 2. A receiving or clamping space is thus formed between the longitudinal web 44 and the base carrier 2, in particular the first web 2A of the base carrier 2, in which the stringer 120 can be received.

The optional bend 44C may be arranged at an end 44B remote from the transverse web 43 with respect to the longitudinal connector direction L1. Alternatively, the longitudinal web 44 may be omitted and the bend 44C may be formed directly at the second end 43B of the transverse web 43. Generally, the bend 44C is bent over towards the base carrier 2 or towards a side facing the base carrier 2. The bend 44C thus defines a hook-shaped structure configured to engage around an end region of the cross-section of the stringer 120, for example, an end of a web of the stringer may be inserted into a receiving slot 44S defined by the bend 44C, as will be further explained with reference in particular to FIGS. 9 and 10. Generally, it may be provided that the coupling structure 40 is adapted to embrace one of an end region of the cross-section of the stringer 120 with respect to the first transverse connector direction C11 and/or with respect to the longitudinal connector direction L1.

The second connecting portion 6 serves for connection to the frame 110. As shown in FIGS. 3 to 5 shown purely by way of example, the second connecting portion 6 can, for example, be arranged in the second end region 22 of the base carrier 2. The second connecting portion 6 may, for example, be integrally formed with the base carrier 2, as exemplified in FIGS. 3 to 5 by way of example. Alternatively, the second connecting portion 6 can also be designed as a part separate from the base carrier 2 and locked thereto, as will be explained in more detail below with reference to FIGS. 12 to 15. Generally, the connecting portion 6 is connected to the base carrier 2.

The connector 1, shown by way of example in FIGS. 3 to 5, comprises a second connecting portion 6 having a coupling structure 60 configured to engage around an end region of a cross-section of the frame 110. As can be seen in particular in FIG. 5, the connecting portion 6 may for example comprise a transverse web 66 having a first end 66A connected to the second end region 22 of the base carrier 2, in particular to the second web 2B of the base carrier 2. The transverse web 66 extends transversely to the base carrier 2, in particular to the second web 2B of the base carrier 2. As exemplified in FIGS. 3 to 5 by way of example, the transverse web 66 may extend in particular in a second transverse connector direction C12, which extends transversely to the longitudinal connector direction L1 and transversely to the first transverse connector direction C11. In general, the second connecting portion 6 can thus be oriented in a second transverse connector direction C12.

The coupling structure 60 of the second connecting portion 6 may comprise a hook-shaped structure 60A, as exemplified in particular in FIG. 5. The hook-shaped structure 60A may be arranged at a second end 66B of the transverse web 66, which is located opposite to the first end 66A and thus facing away from the base carrier 2, as exemplified in FIG. 5. In general, the coupling structure 60 of the second connecting portion 6 may thus be located in an end region 62 of the second connecting portion 6 facing away from the base carrier 2. The hook-shaped coupling structure 60 exemplified in FIG. 5 may define a slot 60S that is open towards the base carrier 2 so that an end region of a cross-section of the frame 110 may be received therein, for example an end of a web of the frame 110, as exemplified in FIG. 8.

Alternatively, or in addition to the hook-shaped structure 60A, the coupling structure 60 of the second connecting portion 6 may also comprise a longitudinal web 67 extending from the second end 66B of the transverse web 66 and along the longitudinal connector direction L1 towards the first end region 21 of the base carrier 2, as exemplified in FIGS. 13 and 14. Optionally, the hook-shaped structure 60A may additionally be formed at an end of the longitudinal web 67 facing away from the transverse web 66.

As further shown in FIGS. 3 to 5, the optional adhesive carrier 7 may be generally formed as a plate having a preferably planar surface 7a. The surface 7a of the adhesive carrier 7 may be coated with an adhesive 70, as schematically shown in FIG. 5. As can be seen in particular in FIG. 5, the adhesive carrier 7 can be arranged, for example, between the first and second connecting portions 4, 6 with respect to the longitudinal connector direction L1. The adhesive carrier 7 is connected to the base carrier 2 and may, for example, be formed integrally therewith. As can be seen in FIG. 5, the adhesive 70 coated surface 7a may be oriented, for example, in the second transverse connector direction C12. In general, the surface 7a may be oriented in the same direction as the second connecting portion 6.

FIG. 6 shows a further connector 1 by way of example only. This differs from the connector 1 shown in FIGS. 3 to 5 only in that it additionally has an optional fastening structure 8. The optional fastening structure 8 is used for attaching additional components, such as cable holders or the like. As shown by way of example in FIG. 6, the fastening structure 8 can be implemented as a plate-shaped part which has one or more recesses 80, for example in the form of through-openings. The fastening structure 8 is connected to the base carrier 2 and may, for example, be integrally formed therewith. As exemplified in FIG. 6, the fastening structure 8 may in particular be arranged between the first and second end regions 21, 22 of the base carrier 2, for example at the first web 2A and extend parallel to the second web 2B. In particular, the fastening structure 8 may be arranged opposite to the second connecting portion 6 with respect to the second transverse connector direction C12, as exemplified in FIG. 6.

FIG. 7 shows an exemplary detailed view of the fuselage structure 100 in the intersection region of frame 110 and stringer 120 in a viewing direction along the longitudinal fuselage axis L100, wherein the frame 110 and the stringer 120 are connected by a connector 1 as explained with reference to FIGS. 3 to 6. FIG. 8 shows a sectional view of the fuselage structure 100 shown in FIG. 7, which results from a section along the line A8-A8 drawn in FIG. 7.

As exemplified in FIG. 7, the stringer 120 may have, for example, a cross-section to be described as S-shaped or Z-shaped. For example, the stringer 120 may have a central web 121 extending along the radial fuselage direction R100, a foot web 122 disposed at a first, outer end of the central web 121 with respect to the radial fuselage direction R100 and extending to a first side of the central web 121 transversely thereof, and a head web 123 disposed at a second, inner end of the central web 121 with respect to the radial fuselage direction R100 and extending to a second side of the central web 121, as shown in FIG. 7 by way of example. The head web 123 may, for example, be curved so that its end remote from the central web 121 faces toward the first end of the central web 121, as shown by way of example in FIG. 7.

The frame 110 may, for example, have a C-shaped cross-section, as shown by way of example in FIG. 8. The frame 110 may have, for example, a plate-shaped central web 111, a web-shaped frame foot 112 arranged at a first, outer end of the central web 111 with respect to the radial fuselage direction R100, and a web-shaped frame head 114 arranged at a second, inner end of the central web 111 with respect to the radial fuselage direction R100, the frame head 114 and the frame foot 112 each extending parallel to each other on a first side of the central web 111.

As exemplified in FIG. 7, the first connecting portion 4 of the connector 1 with the coupling structure 40 embraces an end region of a cross-section of the stringer 120. Here, the head web 123 and a part of the central web 121 of the stringer 120 are sandwiched between the longitudinal web 44 and the first web 2A of the base carrier 2. Further, the end of the head web 123 facing away from the central web 121 is received in the slot 44S defined by the hook-shaped structure 44C. Thus, it may be generally provided that the coupling structure 40 embraces the end region of the S-shaped cross-section of the stringer 120 with respect to the radial fuselage direction R100.

As exemplified in FIG. 8, the second connecting portion 6 of the connector 1 is connected to the frame 110. For example, the transverse web 66 of the second connecting portion 6 may be aligned along the longitudinal fuselage axis L100 and extend across the frame head 114 with respect to the radial fuselage direction R100 within the frame head 114, as exemplified in FIG. 8. The coupling structure 60 of the second connecting portion 6, which is realized in FIG. 8 purely by way of example as a hook-shaped structure 60A, embraces an end of the frame head 114 facing away from the central web 111, or the latter is received in the slot defined by the hook-shaped structure 60A and the transverse web 66.

As can be further seen in FIG. 8, the optional adhesive carrier 7 abuts or is bonded to a second side of the central web 111 of the frame 110 by the adhesive layer 70 (not shown in FIG. 8).

As shown in FIGS. 7 and 8, the connector 1 allows the frame 110 and the stringer 120 to be coupled to each other at their crossing point by form-fittingly connecting the connector to the stringer 120 and optionally also to the frame 110. Thus, a particularly fast and simple assembly is possible. FIGS. 9 to 11 schematically show the sequence of an efficient method for connecting a frame 110 and a stringer 120.

In a first step, the insertion of the end region of the cross-section of the stringer 120 into the coupling structure 40 of the first connecting portion 4 of the connector 1 may take place, for example. As exemplarily shown in FIG. 9, the insertion of the end region of the cross-section of the stringer 120 into the coupling structure 40 of the first connecting portion 4 may be performed, for example, by inserting the end region of the cross-section of the stringer 120, e.g. the end of the stringer head 121 between the coupling structure 40 and the first end region 21 of the base carrier 2. Subsequently, a pivoting of the connector 1 or the base carrier 2 over the stringer 120 can take place. In FIG. 9, this is symbolically indicated by the arrow P9, whereby the second end region 22 of the base carrier 2 is pivoted from the second side of the stringer 120 towards the first side of the stringer 120 until the latter reaches the position shown in FIG. 10, in which the coupling structure 40 completely embraces the end region of the cross-section of the stringer 120.

Furthermore, positioning of the second connecting portion 6 of the connector 1 on the frame 110 is performed, for example by moving the connector 1 along the stringer 120 in the direction of the frame 110 or by moving the stringer 120 along the longitudinal fuselage axis L100 in such a way that the connector 1 is brought closer to the frame 110.

In a further step, the second connecting portion 6 of the connector 1 is connected to the frame 110. If the second connecting portion 6 has a hook-shaped structure 60A as a coupling structure 60, as exemplarily shown in FIGS. 9 to 11, for connecting the second connecting portion 6 to the frame 110, the transverse web 66 of the second connecting portion 6 can be elastically deformed in such a way that the second end 66B of the transverse web 66 is raised in the longitudinal connector direction L1, as exemplarily shown in FIG. 11. As a result, the hook-shaped structure 66A can be pushed along the longitudinal fuselage axis L100 over the frame head 114, as symbolically indicated by the arrow P11 in FIG. 11, until the end of the frame head 114 facing away from the central web 111 engages the hook structure 66A (FIG. 8). In other embodiments of the second connecting portion 6, connecting the second connecting portion 6 of the connector 1 to the frame 110 may comprise riveting, bolting, gluing or welding the second connecting portion 6 to the frame 110.

FIG. 12 shows an example of a detailed view of a further fuselage structure 100 in the intersection region of frame 110 and stringer 120 in a viewing direction along the longitudinal fuselage axis L100, with the frame 110 and the stringer 120 connected by a connector 1. FIG. 13 shows a sectional view of the fuselage structure 100 shown in FIG. 12, which results from a section along the line A13-A13 drawn in FIG. 13. FIG. 14 shows a detailed view of the region marked with the letter Z in FIG. 13.

As can be seen in particular in FIGS. 13 and 14, the connector 1 differs from the connector shown in FIGS. 3 to 6 only in the design of the second connecting portion 6. In FIGS. 12 to 14, the second connecting portion 6 is not formed integrally with the base carrier 2, but is guided on the base carrier 2 so as to be displaceable along the longitudinal connector direction L1. The second connecting portion 6 can in particular have a guiding region 63, which can be formed, for example, by a substantially plate-shaped guiding web 68, as shown by way of example in FIGS. 13 and 14. A locking or detent structure 63A may optionally be formed on the guiding region 63, for example in the form of teeth as shown schematically in FIGS. 13 and 14. As further shown in particular in FIG. 14, the guiding region 63 may extend from the first end 66A of the transverse web 66 of the second connecting portion 6 and transversely to the transverse web 66. In FIGS. 13 and 14, it is exemplified that the coupling structure 60 of the second connecting portion 6 comprises a longitudinal web 67 extending from the second end 66B of the transverse web 66 and along the longitudinal direction L1 towards the first end region 21 of the base carrier 2. Alternatively or additionally, a hook-shaped structure 60A could also be provided, as shown in FIGS. 3 to 6 shown.

In order to guide the connecting portion 6 along the longitudinal connector direction L1, the base carrier 2 may have a guide 28. As shown in FIGS. 13 and 14 as examples, the guide 28 may be formed, for example, by a planar end portion of the second web 2B of the base carrier 2 located in the second end region 22 of the base carrier 2 and by a guiding web 29 extending parallel to the end portion of the second web 2B of the base carrier 2. Thus, the end portion of the second web 2B of the base carrier 2 and the guiding web 29 form a guiding channel in which the guiding region 63 of the second connecting portion 6 is received and guided. For example, the web 68 forming the guiding region 63 may be disposed between the end portion of the second web 2B of the base carrier 2 and the guiding web 29, as exemplified in FIGS. 13 and 14 by way of example.

The guide 28 of the base carrier 2 may optionally include a first locking structure 28A. As exemplarily shown in FIGS. 13 and 14, the first locking structure 28A may be formed, for example, by an elastic web or projection projecting into the guiding channel or from the end portion of the second web 2B of the base carrier 2. The first locking structure 28A engages with the locking structure 63A of the guiding region 63 of the second connecting portion 6, thereby locking the latter in a position with respect to the longitudinal connector direction L1. In particular, the teeth of the locking structure 63A of the guiding region 63 of the second connecting portion 6 may be shaped in such a way and the first locking structure 28A of the base carrier 2 may in particular be elastically deformable in such a way that it allows the guiding region 63 of the second connecting portion 6 to be displaced in one direction, for example in the direction of the first end region 21 of the base carrier 2, and locks it in an opposite direction.

To connect the connector 1 to the frame 110, the second connecting portion 6 can be locked to the base carrier 2, for example subsequently, when the base carrier 2 is already attached to the stringer 120 and positioned relative to the frame 110, for example by inserting the guiding region 63 into the guide 28 of the base carrier 2 and moving the second connecting portion 6, guided by the guide 28, toward the first end region 21 of the base carrier 2 so that the frame 110 is inserted between the longitudinal web 67 and the guiding region 63.

Another difference between the fuselage structure 100 shown in FIGS. 12 to 14 from the fuselage structure 100 shown in FIGS. 7 and 8 is the design of the frame 110. As shown in FIGS. 12 and 13, the frame 110 may be connected to an edge piece 116 that is L-shaped in cross-section. For example, the frame 110 may have an S- or Z-shaped cross-section in which the frame foot 112 and the frame head 114 project on opposite sides from the central web 111 of the frame 110. As exemplified in FIG. 13, the frame head 114 may be substantially L-shaped or bent parallel to the central web 111. In particular, the edge piece 116 and the frame head 114 may be disposed on the same side of the central web 111, with the edge piece 116 being bent toward the same side on which the frame head 114 protrudes from the central web 111 to form the L-shaped cross-section.

As shown by way of example in FIGS. 12 and 13, the connector 1 may be arranged on the same side of the frame 110 to which the frame head 114 projects from the central web 111. An advantage of this design lies in the particularly compact arrangement of the connector 1. Alternatively, the connector 1 may also be arranged on the opposite side of the frame 110 to which the frame head 114 projects from the central web 111, as exemplified in FIG. 15. In this case, the base carrier 2 may be curved or cranked to bridge the frame foot 112. An advantage of this arrangement is that the first connecting portion 4, which is connected to the stringer 120, is arranged at a certain distance from the frame 110. This further improves the supporting effect of the connector 1 against tilting of the frame 110.

As further shown in FIG. 15, the guide 28 of the base carrier 2 may also comprise two parallel guide webs 29 defining the guiding channel. This applies regardless of the design of the frame 110 or the base carrier 2.

FIG. 16 shows by way of example a detailed view of a further fuselage structure 100 in the intersection region of frame 110 and stringer 120 in a viewing direction along the longitudinal fuselage axis L100, wherein the frame 110 and the stringer 120 are connected by a connector 1. FIG. 17 shows a sectional view of the fuselage structure 100 shown in FIG. 16, resulting from a section along the line A17-A17 drawn in FIG. 16. In FIGS. 16 and 17, the frame 110 is S-shaped or Z-shaped, as in FIGS. 12 to 14, and is realized with an edge piece 116.

The fuselage structure 100 shown in FIGS. 16 and 17 differs from the fuselage structure 100 shown in FIGS. 12 to 14 only in the design of the connector 1 and the attachment of the second connecting portion 6 of the connector 1 to the frame. The design of the connector 1 described below can be implemented independently of the design of the frame 110, and is not limited to the combination with a Z-shaped frame 110 having an edge piece 116.

As shown in FIGS. 16 and 17, by way of example, the second connecting portion 6 of the connector 1 may be realized in a plate-like manner, for example in the form of a flange 60B. In particular, the connecting portion 6 may comprise an abutment surface 60c configured to abut against the frame 110. The abutment surface 60c may in particular be flat. For example, the flange 60B may extend along the first transverse connector direction C11. That is, the abutment surface 60c, which may be provided on the flange 60B, is oriented in the second transverse connector direction C12, or a normal vector to the abutment surface 60c points in the second transverse connector direction C12. Thus, the second connecting portion 6 may be generally oriented in a second transverse connector direction C12. As further exemplified in FIGS. 16 and 17, the flange 60B may be disposed in a second end region 22 of the base carrier 2 with respect to the longitudinal connector direction L1. For example, the flange 60B may be arranged at one end of the first web 2A of the base carrier 2 and extend transversely thereto, as shown in FIGS. 16 and 17 by way of example.

As shown in FIGS. 16 and 17 by way of example, the flange 60B may be connected to the central web 111 of the frame 110. In particular, the abutment surface 60c may abut the central web 111 of the frame 110. In FIG. 16, it is shown purely by way of example that the flange 60B is fastened to the central web 111 of the frame 110 by means of rivets, the rivets being represented only symbolically by crosses 150. In principle, other connection options are also conceivable, e.g. gluing, welding, screwing or the like.

FIG. 18 shows, by way of example, a detailed view of a further fuselage structure 100 in the intersection region of the frame 110 and the stringer 120 in a viewing direction along the longitudinal fuselage axis L100, wherein the frame 110 and the stringer 120 are connected by a connector 1. FIG. 19 shows a sectional view of the fuselage structure 100 shown in FIG. 18, obtained by cutting along the line A19-A19 drawn in FIG. 18. In FIGS. 18 and 19, the frame 110 is S-shaped or Z-shaped, as in FIGS. 12 to 17, and is realized with an edge piece 116.

The fuselage structure 100 shown in FIGS. 18 and 19 differs from the fuselage structure 100 shown in FIGS. 16 and 17 only by the design of the connector 1, in particular by the orientation of the plate-shaped second connecting portion 6, and by the design of the edge piece 116 in the region of the stringer recess 115.

As shown in FIGS. 18 and 19, by way of example, the edge piece 116 may have an interruption defining the stringer recess 115. Adjacent to this interruption, the edge piece 116 may include a connecting tab 117 extending along the longitudinal fuselage axis L100 or transverse to the central web 111 of the frame 110 and along the stringer 120. As shown by way of example in FIG. 19, the connecting tab 117 may be bent from one end of the edge piece 116 and may have, for example, a triangular periphery.

As exemplified in FIG. 18, the base carrier 2 of the connector 1 may comprise the first web 2A and the second web 2B, the first and second webs 2A, 2B defining a T-shaped cross-section of the base carrier 2. The first connecting portion 4 may be implemented as described with reference to FIGS. 3 to 6. The first connecting portion 4 is thus oriented in the first transverse connector direction C11, or the transverse web 43 of the first connecting portion 4 protrudes to a first side from the first web 2A of the base carrier 2. The second connecting portion 6 is realized in a plate-like manner and may be realized, for example, by a second side of the first web 2A of the base carrier 2, on which the abutment surface 60c is provided for abutment against the frame 110. Thus, the second connecting portion 6 may be oriented in the first transverse connector direction C11.

As can be seen in FIG. 18, the abutment surface 60c of the plate-shaped second connecting portion 6 provided on the first web 2A of the base carrier 2 may abut the tab 117 of the edge piece 116. The second connecting portion 6 and the tab 117 of the edge piece 116 may be connected, for example, by rivets 150, as shown in FIGS. 18 and 19 by way of example. Of course, it is also conceivable that the tab 117 and the second connecting portion 6 are welded, glued, screwed or connected in a similar manner.

FIG. 20 shows, by way of example, a detailed view of a further fuselage structure 500 in the intersection region of frame 110 and stringer 120 in a viewing direction along the longitudinal fuselage axis L100, wherein the frame 110 and the stringer 120 are connected by a connector 1. FIG. 21 shows a sectional view of the fuselage structure 500 shown in FIG. 20, which results from a section along the line A21-A21 drawn in FIG. 20.

As shown in FIGS. 20 and 21 by way of example, the fuselage structure 500 may comprise a frame 110, a stringer 115, an outer skin 130, and a frame support 510.

The fuselage structure 500 shown in FIGS. 20 and 21 basically comprises the fuselage structure 500 described with reference to FIG. 2. In FIG. 2, a Z- or S-shaped stringer 120 is shown as an example. In contrast to this, in FIGS. 20 and 21 a stringer 120 with an Ω-shaped cross-section is shown.

As shown by way of example in FIG. 21, the frame 110 may have a C-shaped cross-section, for example. In particular, the frame 110 may comprise a plate-shaped central web 111, a web-shaped frame foot 112 disposed at a first, outer end of the central web 111 with respect to the radial fuselage direction R100, and a web-shaped frame head 114 disposed at a second, inner end of the central web 111 with respect to the radial fuselage direction R100, the frame head 114 and the frame foot 112 each extending parallel to each other on a first side of the central web 111. The stringer recess 114 is formed in the region of the frame foot 112. As shown in FIGS. 20 and 21, by way of example, the stringer 120 extends through the stringer recess 115 along the longitudinal fuselage axis L100.

As further shown in FIGS. 20 and 21, the planar extending outer skin 130 is attached to the frame foot 112 of the frame 110 and to the stringer 120.

The structure of the frame support 510 is particularly apparent in FIG. 22. As shown by way of example in FIG. 22, the frame support 510 may particularly include a support foot 512, a support beam 520, a connecting portion 530, and one or more optional abutment plates 540.

For example, as exemplified in FIG. 22, the support foot 512 may be implemented as a plate-like member having a planar first portion 512A and a second portion 512B.

As shown in FIG. 22, the support beam 520 extends from the second portion 512B of the support foot 512 and transversely to the first portion 512A of the support foot 512. The support beam 520 may be generally implemented as a profiled beam. For example, as shown in FIG. 22, the support beam 520 may include a first web 521 and a second web 522 extending transversely to and extending through the first web 521, 522, the first and second webs 521, 522 defining an X- or cross-shaped cross-section of the support beam 520. However, it is also conceivable that the support beam 520 has a different cross-sectional shape, such as a T-shaped cross-section or an H-shaped cross-section. In particular, the support beam 520 and the support foot 512 may be integrally formed.

For example, the connecting portion 530 may be disposed in an end region 524 of the support beam 520 remote from the support plate 512, as exemplified in FIG. 22. The connecting portion 530 comprises a coupling structure 534 configured to embrace an end region of a cross-section of the frame head 114. For example, the connecting portion 530 may be integrally formed with the support beam 520, as exemplified in FIG. 22. Alternatively, the connecting portion 530 may be formed as a part separate from and interlocked with the support beam 520, for example as explained in detail with reference to FIGS. 12 to 15. Generally, the connecting portion 530 is connected to the support beam 520.

As exemplified in FIG. 22, the connecting portion 530 may include, for example, a transverse web 536 having a first end connected to the end region 524 of the support beam 520, in particular to the first web 521 of the support beam 520. The transverse web 536 extends transversely with respect to the support beam 520, in particular with respect to the first web 521 of the support beam 520. As shown by way of example in FIG. 22, the transverse web 536 may extend in particular parallel to the support foot 512 and may be arranged opposite to the first portion 512A of the support foot 512.

The coupling structure 534 of the connecting portion 530 may, by way of example, comprise a hook-shaped structure, as shown examplarily in FIG. 22. The hook-shaped structure may be disposed on one of the transverse web 536 facing away from the support beam 520. The hook-shaped coupling structure 534 exemplified in FIG. 22 may define a slot 538 that is open to the support beam 520 such that an end region of a cross-section of the frame 110 may be received therein, for example, an end of the web-shaped frame head 114, as exemplified in FIG. 21.

Alternatively, or in addition to the hook-shaped structure, the coupling structure 5340 of the connecting portion 530 may also comprise a longitudinal web (not shown) extending from the end of the transverse web 536 and along the support beam 520 toward the support plate 512, similar to the exemplary design of the second connecting portion 6 shown in FIGS. 13 and 14. Optionally, the hook-shaped structure may additionally be formed at an end of the longitudinal web that faces away from the transverse web 536.

The exemplary frame support 510 shown in FIG. 22 is provided with two optional abutment plates 540. Of course, only one abutment plate 540 or more than two abutment plates 540 may be provided. The abutment plate 540 comprises a planar abutment surface 540a, which may optionally be coated with an adhesive layer (not shown). The abutment surface 540a extends transversely to the support plate 512. As exemplified in FIG. 22, a first abutment plate 540 may be disposed in a first end region 523 of the support beam 520 located at the support plate 512 and a second abutment plate 540 may be disposed in the second end region 524 of the support beam 520 facing away from the support plate 512. Generally, the support plate 540 may be disposed between the support foot 512 and the connecting portion 530. For example, the support plate 540 may be integrally formed with the support beam 520 and is generally connected to the support beam 520.

As exemplified in FIG. 21, the support foot 512 may be partially disposed between the outer skin 130 and the frame foot 112. In particular, the first portion 512A of the support foot 512 may be disposed between the outer skin 130 and the frame foot 112. As further shown in FIG. 21, the end of the web-shaped frame head 114 is disposed in the slot 538 of the hook-shaped coupling structure 534 of the connecting portion 530. Thus, the coupling structure 534 embraces an end region of a cross section of the frame head 114.

FIG. 22 schematically illustrates the assembly of the frame support 510 to the frame 110. First, the frame support 510 is arranged on the second side of the frame, which is located opposite to the first side of the central web 111 of the frame 110, from which the frame foot 112 and the frame head 114 protrude. In this regard, the frame support 510 is oriented such that the first portion 512A of the frame foot 512, the connecting portion 530, and the optional abutment plates 540 face the frame 110. As symbolically indicated by the arrow P22, the frame support 510 is moved toward the frame 510 with the first portion 512A of the support foot 512 overlapping over the frame foot 112 and the connecting portion 530 overlapping over the frame head 114 until the hooked coupling structure 534 engages the end of the frame head 114 and the optional support plates abut the central web 111 of the frame 110, as exemplified in FIG. 21.

Although the present invention has been explained above by way of examples of embodiments, it is not limited thereto, but can be modified in a variety of ways. In particular, combinations of the preceding embodiment examples are also conceivable.

LIST OF REFERENCE SIGNS 1 connector
2 base carrier
4 first connecting portion
6 second connecting portion
7 adhesive carrier
7a surface of the adhesive carrier
8 fastening structure
21 first end region of the base carrier
21E first end of the base carrier
22 second end region of the base carrier
28 guide
28A locking structure
29 guiding web
40 coupling structure of the first connecting portion
42 end region of the first connecting portion
43 transverse web of the first connecting portion
43A first end of the transverse web
43B second end of the transverse web
44 longitudinal web of the first connecting portion
44B end of the transverse web
44C bend
44S slot
60 coupling structure of the second connecting portion
60A hook-shaped structure
60B flange
60c abutment surface
62 end region of the second connecting portion
63 guiding region
63A locking structure
66 transverse web of the second connecting portion
66A first end of the transverse web
66B second end of the transverse web
67 longitudinal web of the second connecting portion
68 guiding web
70 adhesive layer
80 recesses
100 fuselage structure 110 frame
111 central web of the frame
112 frame foot
114 frame head
115 stringer recess
116 edge piece
117 tab
120 stringer
121 central web
122 foot web
123 head web
130 outer skin
150 rivets
200 aircraft
210 fuselage
220 wings
230 vertical stabilizer
240 elevator
500 fuselage structure
510 frame support
512 support foot
512A first portion of the support foot
512B second portion of the support foot
520 support beam
530 connecting portion
532 end region
534 coupling structure
536 transverse web
538 slot
C11 first transverse connector direction
C12 second transverse connector direction
L1 longitudinal connector direction
L100 longitudinal fuselage axis
P9 arrow
P11 arrow
P22 arrow
R100 radial fuselage direction

The invention claimed is:

1. A connector for connecting a frame to a stringer of a fuselage structure of an aircraft, comprising:
a base carrier extending in a longitudinal connector direction;
a first connecting portion connected to the base carrier and extending in a first transverse connector direction, the first connecting portion having, in an end region remote from the base carrier, a coupling structure for engaging around an end region of a cross section of the stringer; and
a second connecting portion connected to the base carrier and adapted to be connected to the frame,
wherein the second connecting portion is oriented in a second transverse connector direction, the second transverse connector direction being transverse to the longitudinal connector direction, and
wherein the second connecting portion is arranged in a second end region of the base carrier with respect to the longitudinal connector direction and extends in the second transverse connector direction, and wherein the second connecting portion comprises, in an end region facing away from the base carrier, a coupling structure for engaging around an end region of a cross section of the frame and
wherein the first connecting portion and second connecting portion are transverse to one another.

2. The connector of claim 1, wherein the second connecting portion is integrally formed with the base carrier.

3. The connector of claim 1, wherein the second connecting portion has a guiding region which is displaceably guided in a guide of the base carrier in the longitudinal direction of the connector, and wherein the guide comprises a first locking structure, which engages in a locking structure formed in the guiding region.

4. The connector of claim 1, further comprising:
a plate-shaped adhesive carrier having a surface oriented in the second transverse connector direction and coated with an adhesive;
wherein the adhesive carrier is arranged between the first and second connecting portions with respect to the longitudinal connector direction and is connected to the base carrier.

5. The connector of claim 1, wherein the second connecting portion is plate-shaped for abutment against a plate-shaped region of the frame.

6. The connector of claim 5, wherein the second connecting portion is arranged in a second end region of the base carrier with respect to the longitudinal connector direction.

7. The connector of claim 1, wherein said first connecting portion comprises a transverse web extending in the first transverse connector direction and having a first end connected to the base carrier, wherein the coupling structure comprises a longitudinal web extending from a second end of the transverse web along a first end region of the base carrier, the longitudinal web having a U-shaped bend at an end facing away from the transverse web on a side facing the base carrier.

8. A fuselage structure for an aircraft, comprising:
a frame, enclosing a longitudinal fuselage axis and comprising a stringer recess;
a stringer extending along the longitudinal fuselage axis through the stringer recess of the frame; and
a connector for connecting the frame to the stringer, comprising:
a base carrier extending in a longitudinal connector direction;
a first connecting portion connected to the base carrier and extending in a first transverse connector direction, the first connecting portion having, in an end region remote from the base carrier, a coupling structure for engaging around an end region of a cross section of the stringer; and
a second connecting portion connected to the base carrier and adapted to be connected to the frame,
wherein the second connecting portion is oriented in a second transverse connector direction, the second transverse connector direction being transverse to the longitudinal connector direction,
wherein the second connecting portion is arranged in a second end region of the base carrier with respect to the longitudinal connector direction and extends in the second transverse connector direction, and wherein the second connecting portion comprises, in an end region facing away from the base carrier, a coupling structure for engaging around an end region of a cross section of the frame,
wherein the first connecting portion of the connector with the coupling structure embraces an end region of a cross-section of the stringer; and
wherein the second connecting portion of the connector is connected to the frame.

9. The fuselage structure of claim 8, wherein the stringer has an S-shaped cross-section, and wherein the coupling structure embraces the end region of the S-shaped cross-section of the stringer with respect to a radial fuselage direction perpendicular to the longitudinal fuselage axis.

10. A method of connecting a frame and a stringer of a fuselage structure according to claim 8, comprising:
- inserting the end region of the cross-section of the stringer into the coupling structure of the first connecting portion of the connector;
- positioning the second connecting portion of the connector to the frame; and
- connecting the second connecting portion of the connector to the frame.

\* \* \* \* \*